Dec. 23, 1941.    B. S. GARBER    2,267,234
AGRICULTURAL MACHINE
Filed June 4, 1940    4 Sheets-Sheet 1

Inventor
B. S. GARBER
By Malcolm F. Gannett
Attorney

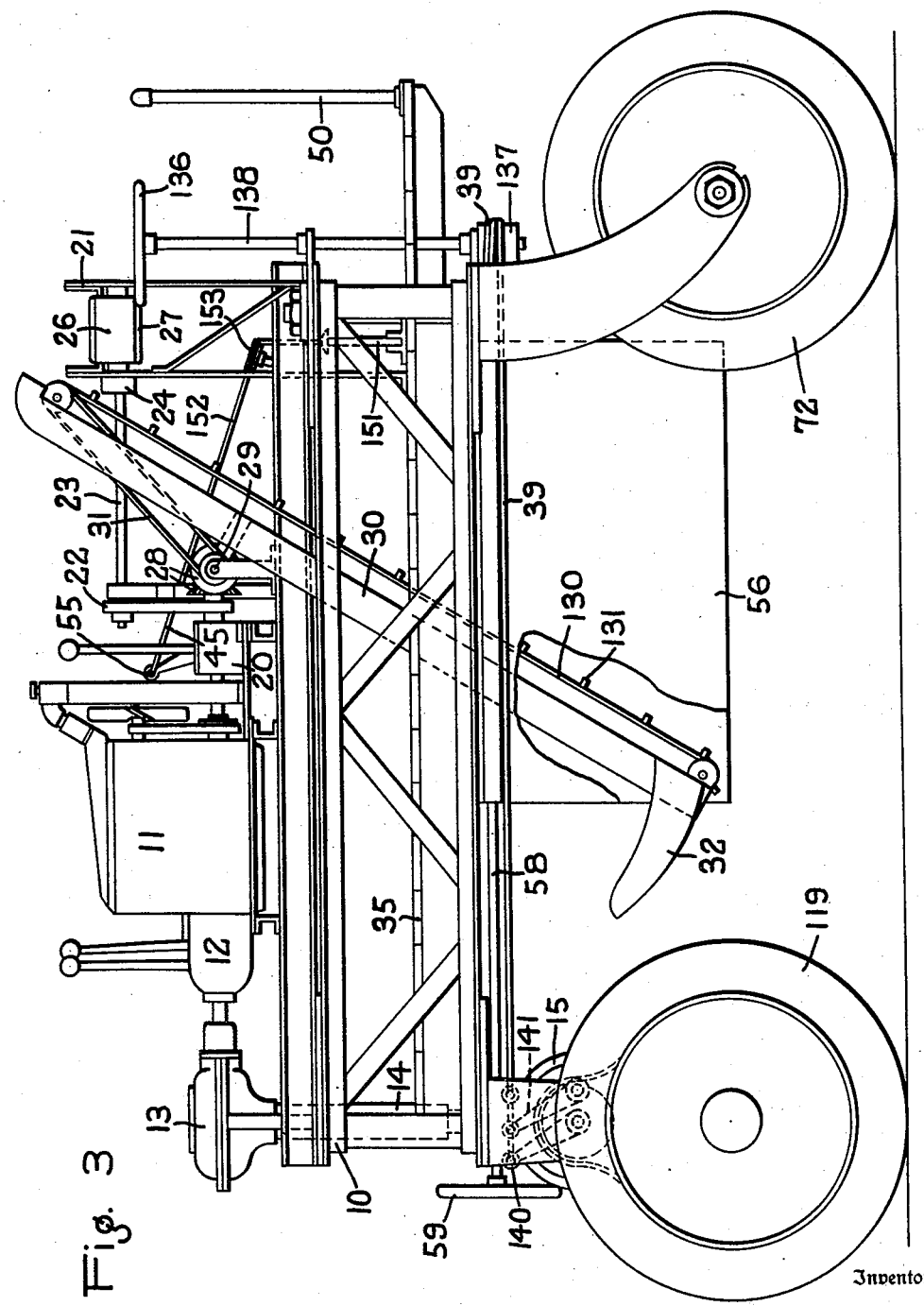

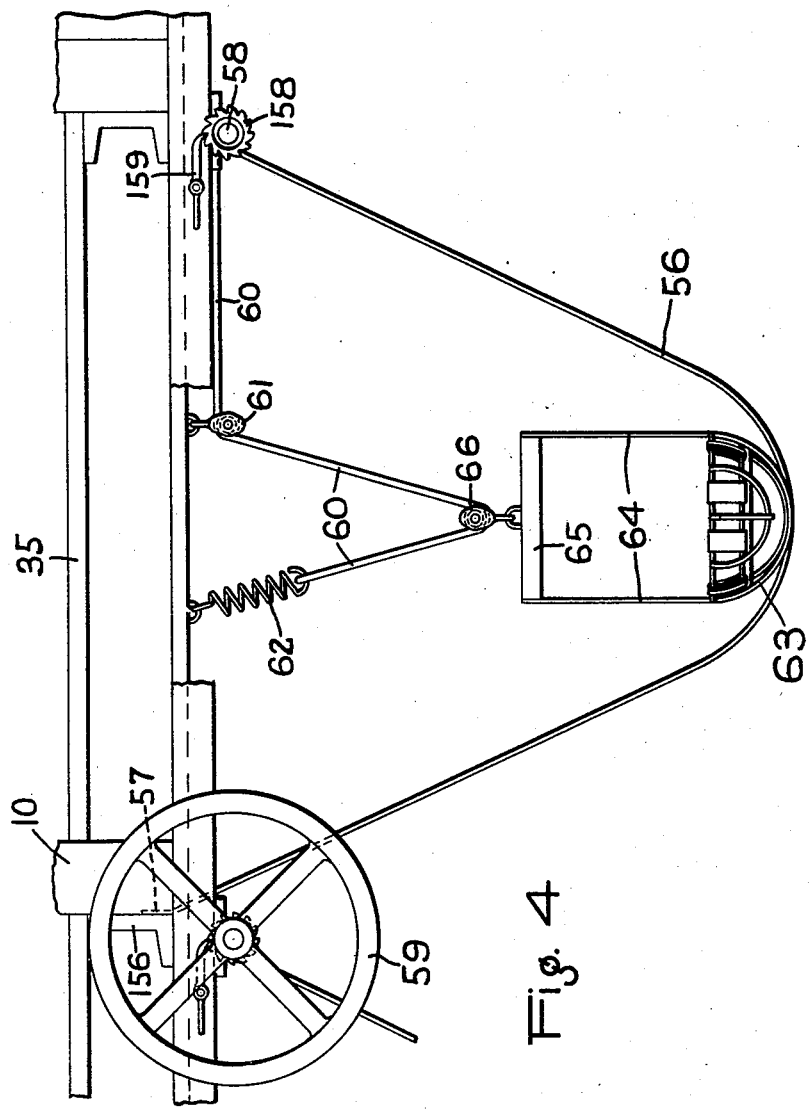

Patented Dec. 23, 1941

2,267,234

UNITED STATES PATENT OFFICE 2,267,234

AGRICULTURAL MACHINE

Benjamin Snavely Garber, Willow Street, Pa.

Application June 4, 1940, Serial No. 338,685

4 Claims. (Cl. 214—83)

This invention relates to agricultural machines of the type having means for supporting one or more workmen and for transporting the workmen over the ground in such a position that the workmen can readily plant, cultivate, thin, and harvest crops of vegetables, fruits and the like. More specifically the machine of the present invention has been designed for use in gathering tomatoes.

An object of the invention is to provide an improved agricultural machine embodying a vehicle movable over a field and having an elevator extending upwardly from a point above the ground to a position to discharge the picked fruit and vegetables on to a conveyor arranged transversely of the machine in spaced relation above the main floor of the machine.

Another object of the invention is to provide an improved agricultural machine of the above type having an adjustable supporting means for a workman suspended from the vehicle and located in proximity to the lower end of the elevator.

Another object of the invention is to provide an improved agricultural machine of the above type in which the supporting means for a workman includes a hammock for the body of the workman and a head rest arranged in spaced relation to the hammock so as to permit free movements of the workman's arms in gathering fruits and vegetables, means being operatively connected to the hammock and to the head rest for simultaneously raising and lowering both said body supporting means.

Another object of the invention is to provide an improved agricultural machine of the above type which is adapted to be used for gathering fruits and vegetables, such as tomatoes, from an entire field in a minimum of time and with a minimum of labor.

With these and other objects in view, the invention consists in the novel features of construction, combination of elements and arrangement of parts, hereinafter more fully described and claimed.

In the accompanying drawings:

Fig. 3 is an end elevation with a portion cut away; and

Fig. 4 is an enlarged detail front elevation of a portion of the supporting means for a workman.

Figure 1:
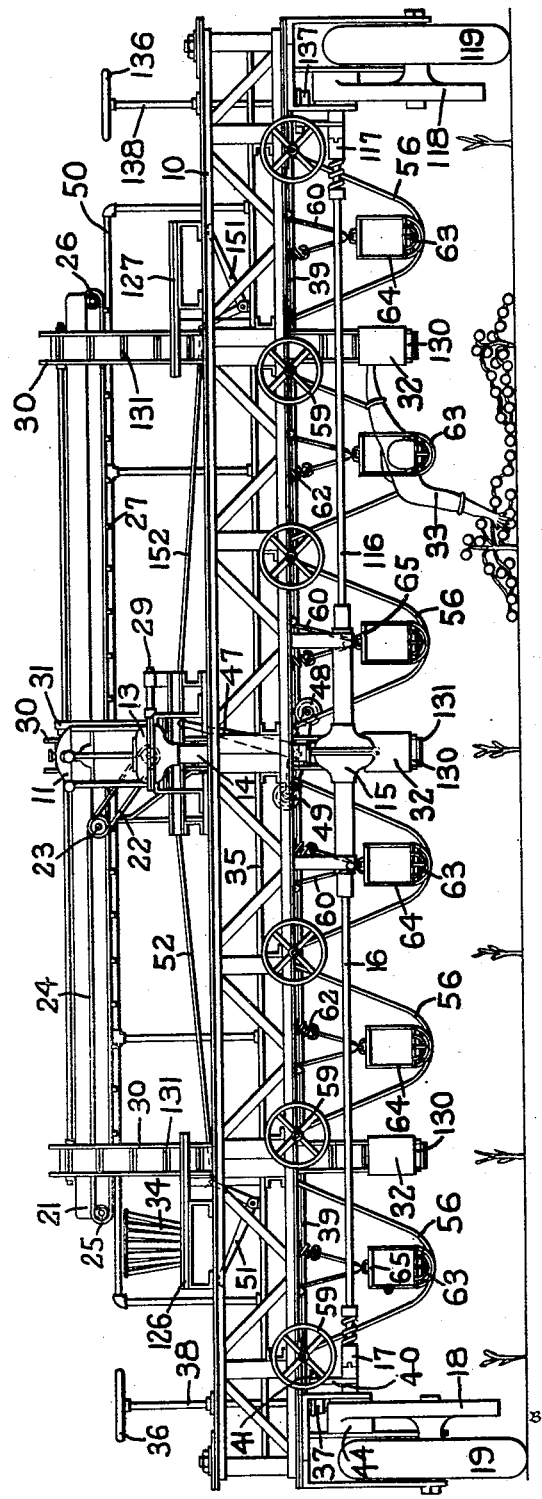
Fig. 1 is a front elevation of an agricultural machine embodying the present invention.

Referring to the drawings, the machine comprises a frame 10 preferably constructed of structural steel members, such as channels, angles, and bars, arranged in the form of a rectangle. This frame may be made of such size as to extend over several rows of plants.

Mounted on the frame 10 is a prime mover, such as an internal combustion engine 11.

The engine 11 provides motive power through a multiple speed change transmission 12, thence through gearing encased in a housing 13 driving a downwardly extending shaft 14 to gearing encased in a housing 15.

The gearing in housing 15 is operatively connected to shafts 16 and 116 extending in opposite directions from the housing 15.

At their outer extremities the shafts 16 and 116 are, respectively, provided with clutches 17 and 117 adapted to connect the shafts 16 and 116, when desired, with gearing encased in housings 18 and 118, respectively, at each end of the machine.

The gearing within each housing 18 and 118 is in the form of reduction gears which are operatively connected, respectively, with the wheels 19 and 119 so as to provide means for driving the machine over the ground.

The engine 11 with the transmission 12 attached thereto may be of the type commonly used in the construction of motor vehicles. Likewise, the housing 15 and the shafts 16 and 116 may be of the usual type of differential housing and gears, and drive shafts, respectively, commonly used in the construction of motor vehicles. Also, the gear housings 13, 18 and 118 may be of the types commonly now used in the construction of farm tractors and the like vehicles. In fact, the driving mechanism of the machine may be composed of standard parts used in the construction of automotive vehicles, and, therefore, it has not been deemed necessary to illustrate the same in detail, since their construction is well known to those skilled in the art to which the present invention appertains.

Another speed transmission 20 is operatively connected to the motor 11.

The transmission 20 is adapted to be used to operatively connect the engine 11 with the driving mechanism for a conveyor 21 arranged transversely of the machine in spaced relation above the frame 10.

The transmission 20 is operatively connected to the conveyor 21 by means of a belt or chain 22, driving jack-shaft 23, and a belt 24 driven from said jack-shaft to a pulley 25 which drives the belt 26 of the conveyor 21.

Figure 2:
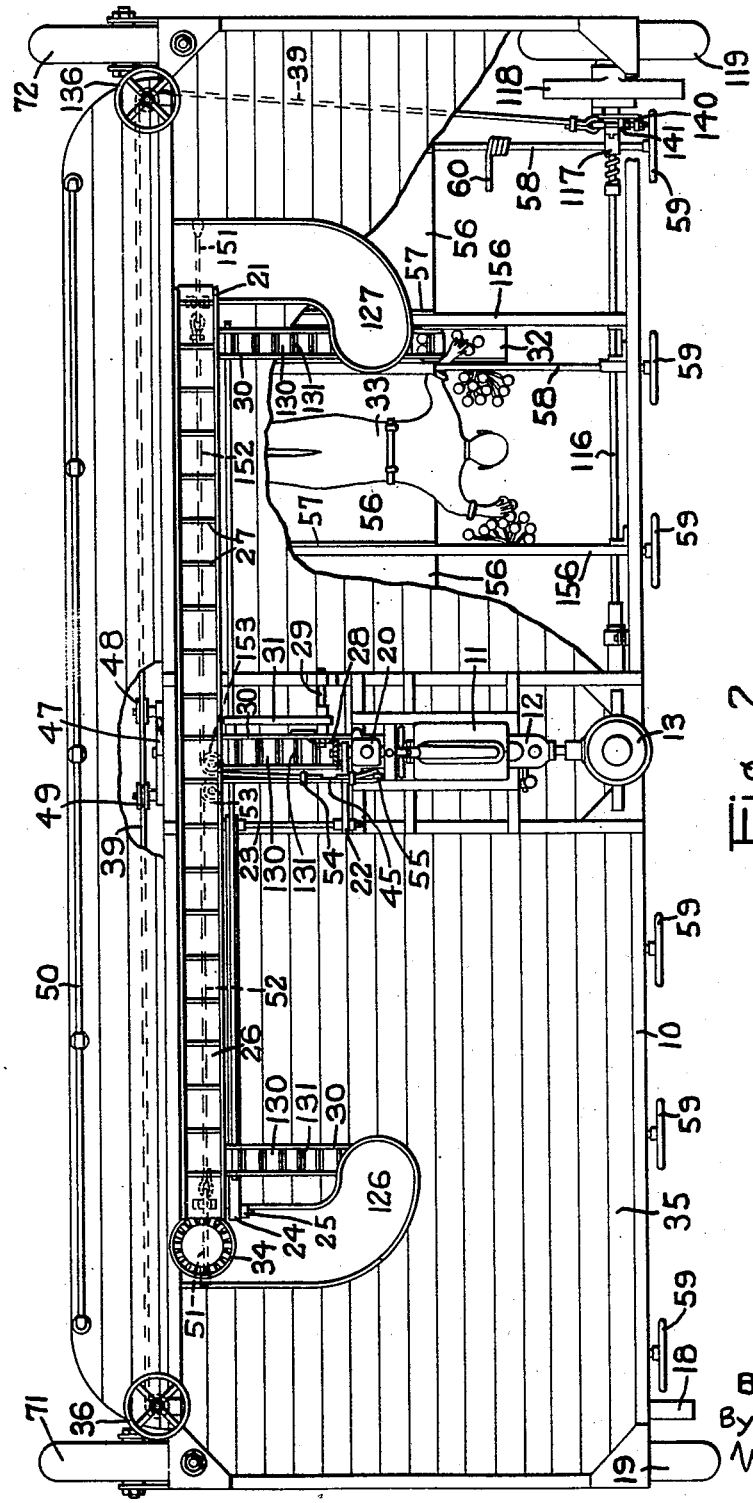
Fig. 2 is a plan view of the machine shown in Fig. 1 with a portion of the superstructure broken away.

The conveyor belt 26 is formed with the usual upstanding lugs 27 arranged transversely thereof at substantially uniform distances apart, as shown in Fig. 2.

The conveyor belt 26, at each end, terminates at a distance from the ends of the machine, at points over platforms 126 and 127 mounted on top of the frame 10.

The conveyor belt 26 may be operated in either direction by running the belt 24 straight or crossed.

From the transmission 20, power may also be transmitted through gears 28 to a shaft 29 which drives three elevators 30 by means of a belt 31.

Each elevator 30 has a scoop shaped trough 32 attached to its lower end, as shown in Fig. 3.

The vegetables and other agricultural products are adapted to be deposited in the troughs 32 by the pickers 33. The troughs are formed so that the vegetables or fruits are directed to the lower end portions of the conveyors 130 of the elevators 30. The conveyors 130, which are formed with lugs 131 similar to the lugs 27 heretofore referred to, carry the vegetables upwardly and discharge the same on to the conveyor belt 26.

The conveyor belt 26 then carries the vegetables to baskets 34 disposed on the platforms 126 and 127.

An attendant shifts the full baskets aside on the platforms 126 and 127, from which they are adapted to be removed and placed on the storage floor 35 by another attendant.

One of the attendants may also steer the machine by means of either one of the steering wheels 36 and 136.

Steering of the machine is accomplished by means of drums 37 and 137 secured to the lower ends of the steering posts 38 and 138, respectively, around which drums are placed a few turns of a cable 39.

One end of the cable 39 is secured to clutch arm 40 and brake arm 41 and the other end of said cable is secured to clutch arm 140 and brake arm 141.

To steer the machine to the left, for example, either steering wheel is turned to the left or in a counterclockwise direction, Fig. 2, thereby operating or disengaging the clutch 17 and also applying the brake which is encased in housing 44. This momentarily stops the left driving wheel 19 and the power continuing to the right driving wheel 119 causes the machine to turn towards the left.

The reverse operations will, of course, make a right turn.

In addition to the driving wheels 19 and 119 the machine may be supported on caster wheels 71 and 72. These caster wheels are mounted on the frame 10 so as to follow in the direction the machine is steered.

In order to stop the machine while the engine 11 is running, the operator actuates winch-lever 47 so as to raise sheave pulley 48 and lower sheave pulley 49, thus disengaging both clutches 17 and 117 and actuating both brakes 41 and 141 (see Figs. 1 and 2).

For the convenience of the attendants in moving from one end of the machine to the other, the floor 35 extends rearwardly of the conveyor 21 to form a "cat-walk." A guard rail 50 is mounted along the rear edge of the floor 35.

Provision is also made for starting and stopping the elevators and conveyors by means of two foot pedals or levers 51 and 151 which are placed at the convenience of the attendants at either end of the machine.

Attached to the foot pedal 51 is a rope or cable 52 which passes over a pulley 53 and extends to a common connection 54. From the connection 54 a cable 45 extends to a clutch arm 55.

Attached to the foot pedal 151 is a rope or cable 152 which passes over a pulley 153 and is connected to the cable 52 at the connection 54.

The clutch arm 55 is adapted to actuate a clutch mounted within transmission housing 20, said arm 55 functioning in a manner similar to the clutch pedal of an automobile.

For the purpose of supporting workmen in a reclining position, suspended from the frame 10, are a plurality of hammocks 56.

As shown in Fig. 4, each hammock comprises a sheet of fabric, such as canvas, one longitudinal edge 57 of which is secured to a bar 156 of the frame 10. The other longitudinal edge of the hammock is rolled around a shaft 58 to which is secured a hand wheel 59. In Fig. 4 the right hand wheel 59 has been omitted from the shaft so as to show more clearly the means for locking the shaft from rotation.

Fixed to each shaft 58 near the front of the machine is a toothed wheel 158 and pivotally mounted on the frame 10 is an arm 159 having an end adapted to be inserted in the space between two of the teeth of the wheel 158 to prevent rotation of the shaft 58 in a counterclockwise direction.

As shown in Fig. 2 the hammocks 56 are disposed at a distance rearwardly from the front edge of the machine.

At a point spaced from the front end of each hammock and also suspended from the frame 10 is a head rest 63.

The head rest 63 comprises a skeleton structure having a head receiving portion and side members 64 extending upwardly from the head receiving portion.

The upper ends of the side members 64 are connected by means of a cross bar 65 to which is pivotally connected a pulley 66.

A rope or cable 60 having one end portion coiled around the shaft 58, extends over a pulley 61, and thence downwardly and around the pulley 66, and thence upwardly where the other end of the cable is attached to one end of a coil spring 62. The other end of the spring 62 is secured to the frame 10.

In this way the head receiving member 63 is resiliently supported from the machine.

The relationship of the head receiving member 63 to the hammock 56 is such that a worker is conveniently carried by the machine in a reclining position so that the worker's arms are free to pick vegetables or do other agricultural work. Since both the head receiving member 63 and the hammock 56 are operatively connected to the shaft 58, when the hand wheel 59 is actuated to rotate said shaft, the hammock and the head receiving member will be simultaneously raised or lowered, depending in which direction the hand wheel is turned.

A machine embodying the present invention has been in use on my farm during the harvesting season by workers gathering tomatoes. The machine has taken the backache and drudgery out of this sort of farm work. No longer do the workers have to trudge through the fields with baskets and find no place to set them down or a place to walk without crushing the fruit or vegetables or trampling over the vines, etc. In using the machine, the workers lie in the hammocks with ease and pick rapidly with both hands while the machine slowly moves over the rows of plants. This means a great saving in the crop, time and labor. Progress of the machine over a field naturally must be slow to enable the workers or pickers to gather the fruit or vegetables clean and make the proper selection of same. The slow travel of the machine also simplifies the steering to the extent that an operator may leave a steering wheel and attend to other work, such as tending the baskets or grading the product, etc. Ample storage for the baskets is provided on the floor of the machine until the machine comes to an end of a field, at which point the loaded baskets can be transferred to a truck. Since the workers or pickers are suspended in the hammocks under the floor of the machine, they are protected from rain and hot sun.

Having thus described my invention, what I claim is:

1. A harvesting machine for fruits and vegetables comprising a frame, means for supporting the frame in spaced relation above the ground, a hammock suspended from the frame for supporting the body of a worker, a head supporting member suspended from the frame in spaced relation to the hammock for supporting the head of the worker, and a single means operatively connected to said hammock and to said head supporting member for simultaneously raising or lowering said hammock and said head supporting member.

2. A harvesting machine comprising a frame, means for supporting the frame in spaced relation above the ground and including a pair of front driving wheels and a pair of caster wheels disposed at the rear of the frame in alinement with the front wheels, means for steering the front driving wheels, an engine, means for driving each front wheel from said engine, a platform mounted above the frame and located near each end of the machine, a conveyor extending transversely of the machine from platform to platform for delivering fruits and vegetables to baskets mounted on said platforms, means for operating said conveyor from said engine, a plurality of elevators extending from adjacent said conveyor downwardly towards the ground, a hammock suspended from the frame for supporting the body of a worker, a head supporting member suspended from the frame in spaced relation to the hammock for supporting the head of the worker, and a single means operatively connected to said hammock and to said head supporting member for simultaneously raising and lowering said hammock and said head supporting member.

3. An agricultural machine of the class described comprising a vehicle movable over a field, said vehicle having a floor disposed in spaced relation above the ground, a conveyor extending transversely of the machine and mounted in elevated position above said floor, an elevator extending upwardly from a point beneath the floor of the machine to a point over said conveyor so that agricultural products are discharged from the elevator on to said conveyor, a hammock suspended beneath the floor for supporting the body of a worker, a head supporting member suspended beneath the floor in spaced relation to the hammock for supporting the head of the worker, and a single means operatively connected to said hammock and to said head supporting member for simultaneously raising and lowering said hammock and said head supporting member with respect to the lower end of said elevator.

4. An agricultural machine of the class described comprising a vehicle movable over a field, said vehicle having crop distributing means disposed above the top thereof, an elevator extending from said distributing means downwardly towards the ground, a hammock suspended from the frame of said vehicle for supporting the body of a worker in proximity to the lower end of said elevator, a head supporting member suspended from the vehicle frame in spaced relation to the hammock for supporting the head of the worker, and a single means operatively connected to said hammock and to said head supporting member for simultaneously raising and lowering said hammock and said head supporting member with respect to the lower end of said elevator.

BENJAMIN SNAVELY GARBER.